O. E. DINGLEY.
DEMOUNTABLE RIM FOR VEHICLE WHEELS.
APPLICATION FILED OCT. 18, 1915.
1,205,866.
Patented Nov. 21, 1916.
Fig_1_
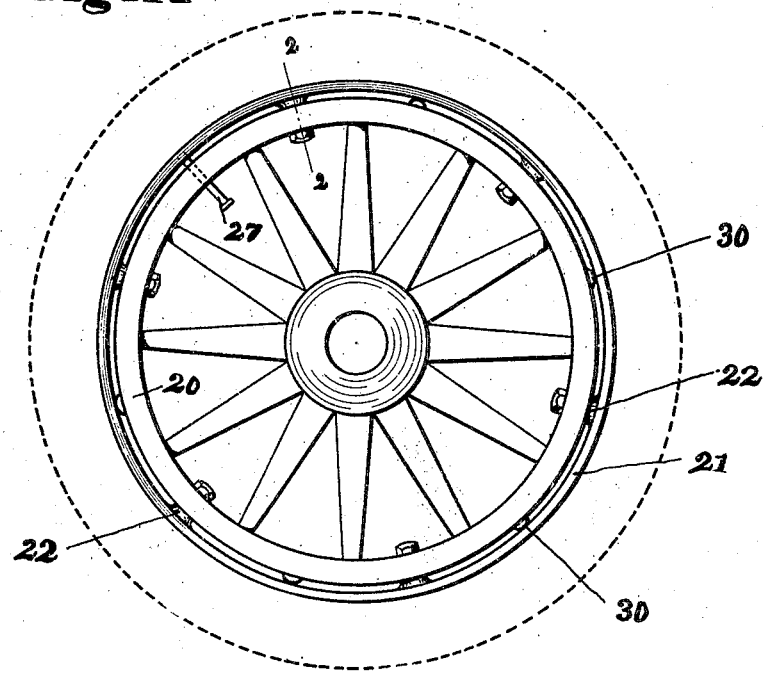
Fig_2_
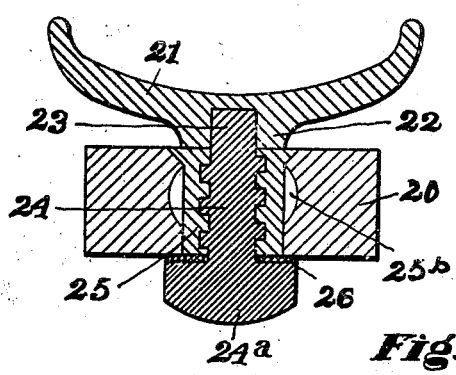
Fig_3_
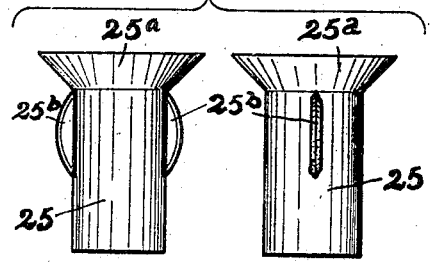
Fig_4_
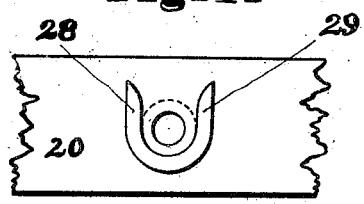
WITNESS
Edward A. Breed,
INVENTOR,
Otis E. Dingley,
BY
Allen & Daggett
ATTORNEYS.

UNITED STATES PATENT OFFICE.

OTIS E. DINGLEY, OF WEST FARMINGTON, MAINE.

DEMOUNTABLE RIM FOR VEHICLE-WHEELS.

1,205,866.　　　　Specification of Letters Patent.　　Patented Nov. 21, 1916.

Application filed October 18, 1915. Serial No. 56,416.

*To all whom it may concern:*

Be it known that I, OTIS E. DINGLEY, a citizen of the United States, residing at West Farmington, in the county of Franklin, in the State of Maine, have invented a certain new and useful Improvement in Demountable Rims for Vehicle-Wheels, of which the following is a specification, reference being had to the accompanying drawings.

The immediate object of this invention is to provide means for detachably securing tire-supporting rims to the fixed wooden fellies of wheels of automobiles and other vehicles; my improved construction being such that a disabled tire may be removed and a new tire substituted therefor in two minutes, or less time, without the detachment of nuts or bolts, as I have explained in detail hereinafter.

My invention is illustrated in the annexed drawing, Figure 1 being a side view of a wheel equipped with my present improved demountable rim mechanism. Fig. 2 is a relatively enlarged, transverse sectional view taken on the line 2—2 of said Fig. 1. Fig. 3 shows two side views of a thimble or bushing 25 which is fixed in the wooden felly of the wheel and is threaded internally to receive a screw which, when the several parts of my device are assembled, operates as a bolt to prevent the accidental separation of the tire-supporting rim and the wooden felly of the wheel.

In Fig. 2 the said bushing and screw are shown assembled, mainly in central longitudinal section. Fig. 4 is an inner side view of a portion of the tire-supporting rim showing particularly one of the integral sockets adapted to receive the end of one of the "bolts" which I have mentioned above.

Referring to these drawings, the numeral 20 indicates the felly of a vehicle wheel, and 21 denotes the detachable metal rim on which the tire proper is mounted, said tire being indicated by the dotted circle in Fig. 1. My present invention, however, has no relation to the manner of mounting the rubber tire on the said rim; said invention relating only to the means for detachably securing the rim to the fixed felly of the vehicle wheel. On the inner face of the rim 21 are hub-like projections 22 (as here shown) which are chambered as at 23 to receive the free ends of screws 24 that are located in bushings 25, which bushings are fixedly forced into the wooden felly; each bushing being, preferably, formed with an enlarged outer end portion, as at 25ª, to limit the entrance of the bushing in the felly, and also with one or more fins 25ᵇ which prevent the rotation of the bushing in said felly after the bushing has been forced home in the felly. The bushings 25 are arranged in radial relation to the wheel center and are of such number, and so spaced apart, that they register with the hubs 22 on the inner side of the rim 21 and so that, when the screws 24 are screwed home, the outer end portion of each screw will enter the opening, or socket, 23 in one of the hubs 22, thus providing a plurality of bolt fastenings between the tire rim and the wheel felly. By preference I provide such bolts between every other pair of spokes, that is to say, if the wheel has twelve spokes, I provide six of the described screw bolts although the number of bolts is not arbitrarily fixed by me.

The numeral 24ª denotes the head of the screw 24 and the numeral 26 identifies a spring washer located on the body of the screw just under the head 24ª. The rim 21 and the felly 20 are formed with registering holes to receive the customary valve stem 27 when the parts are assembled and, at a point on the felly, approximately opposite the said valve hole, I fasten guide plates 28—29 at the opposite sides of one of the bushings 25.

In the operation of mounting a tire-rim on a wheel, the bolts 24 are first unscrewed, as seen in full lines in Fig. 4. That portion of the ring which carries the valve stem is then located over the felly at the point where the valve-stem hole is located and the said stem is entered in the last named hole. The tire rim 21 is then slipped laterally onto the felly 20, one of the hubs 22 meanwhile entering between the guides 28—29 and each of the other bolts will then be found to register precisely with its particular socket 23. The several bolts 24 are then screwed home and it will now be understood that the rim 21 will be securely fastened to the wheel felly until such time as it may be desired to remove the said rim when it is only necessary to unscrew each bolt a single turn, as I have intentionally adopted a four-to-the-inch thread, so that the bolts may be quickly withdrawn from the sockets 23, and so that the bolts will still remain in their respective bushings 25. It will thus be seen that there are no detached bolts, nuts, or other parts to be lost, or dropped in the dirt, during the operation of removing an old tire and replacing it with a new one. As an additional support for the tire rim 21 lumps 30 may be fixed in the perimeter of the wooden felly 20 between the bolts 24 although such additional supports are not regarded by me as absolutely necessary.

My described construction renders it possible and convenient to make a quick-shift whenever it is necessary or desirable to change tires and the change may be readily effected by anyone who is not at all familiar with mechanics or mechanical devices or tools.

Having thus described my invention I claim as new and wish to secure by Letters Patent:—

A demountable rim for vehicles, including a rim, a felly, a plurality of internally threaded bushings mounted in said felly and having outwardly flared ends forming bearing surfaces flush with the outer periphery of said felly, a plurality of inwardly projecting hub-like extensions formed integral with the inner periphery of said rim and resting on said bearing surfaces, said extensions being provided with inwardly facing sockets, guide plates fastened on said felly surrounding one of said bushings and adapted to receive one of said hub-like extensions therein to position all of said sockets in registration with the bores of said bushings, and a plurality of bolts engaged with said bushings and having unthreaded outer ends adapted to extend beyond said felly and be loosely received in said sockets.

OTIS E. DINGLEY.